(12) United States Patent
van Bemmel

(10) Patent No.: US 7,877,786 B2
(45) Date of Patent: Jan. 25, 2011

(54) METHOD, APPARATUS AND NETWORK ARCHITECTURE FOR ENFORCING SECURITY POLICIES USING AN ISOLATED SUBNET

(75) Inventor: Jeroen van Bemmel, Leiden (NL)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1071 days.

(21) Appl. No.: 10/970,350

(22) Filed: Oct. 21, 2004

(65) Prior Publication Data
US 2006/0101409 A1 May 11, 2006

(51) Int. Cl.
G06F 7/04 (2006.01)
(52) U.S. Cl. .............................. 726/4; 726/1
(58) Field of Classification Search ................ None
See application file for complete search history.

(56) References Cited

U.S. PATENT DOCUMENTS

| | | | |
|---|---|---|---|
| 5,805,803 A * | 9/1998 | Birrell et al. ................ 726/12 |
| 6,202,157 B1 * | 3/2001 | Brownlie et al. ............. 726/1 |
| 6,779,120 B1 * | 8/2004 | Valente et al. ............... 726/1 |
| 7,249,187 B2 * | 7/2007 | Sobel et al. ................. 709/229 |
| 7,363,650 B2 * | 4/2008 | Moriconi et al. ............ 726/1 |
| 2002/0178380 A1 * | 11/2002 | Wolf et al. ................ 713/201 |
| 2003/0041266 A1 | 2/2003 | Ke et al. |
| 2003/0055962 A1 * | 3/2003 | Freund et al. ............. 709/225 |
| 2003/0065773 A1 * | 4/2003 | Aiba et al. ................ 709/224 |
| 2003/0177389 A1 * | 9/2003 | Albert et al. .............. 713/201 |
| 2004/0107274 A1 * | 6/2004 | Mastrianni et al. ........ 709/223 |
| 2005/0063400 A1 * | 3/2005 | Lum ......................... 370/401 |
| 2005/0097199 A1 * | 5/2005 | Woodard et al. .......... 709/223 |
| 2005/0185626 A1 * | 8/2005 | Meier et al. ............... 370/338 |

FOREIGN PATENT DOCUMENTS

EP    05 25 6095    2/2006

OTHER PUBLICATIONS

Kerberos (Sean Deuby, "Windows 2000 Server: Planning and Migration", ISBN: 157870023-x, 1999), p. 82-90.*
Paxson (Vern Paxson, "Bro: A System for Detecting Network Intruders in Real-Time", 1999).*

* cited by examiner

Primary Examiner—Kambiz Zand
Assistant Examiner—Peter Poltorak
(74) Attorney, Agent, or Firm—Wall & Tong, LLP

(57) ABSTRACT

A method for enforcing security policies required to gain access to a network includes determining if a client desiring a connection to the network is in conformance with a current version of the security policies, and if a client is not in conformance with a current version of the security policies, denying the client access to the network and directing the client to an isolated sub-network for accessing a current version of the security policies. In one embodiment of the present invention an address server isolates non-conforming clients from the network and the network resources by directing non-conforming clients to an isolated sub-network. The isolated sub-network further directs the non-conforming clients to, for example, a local server or web-site for accessing a current version of the security policies.

18 Claims, 3 Drawing Sheets

METHOD, APPARATUS AND NETWORK ARCHITECTURE FOR ENFORCING SECURITY POLICIES USING AN ISOLATED SUBNET

FIELD OF THE INVENTION

The present invention relates to the field of data networks and, more specifically, to methods of protecting network systems from viruses and other malicious applications by enforcing security policies using an isolated sub-network.

BACKGROUND OF THE INVENTION

Although the universal increase in the implementation of the Internet and local intranets has resulted in many desirable results, such as the speed and breadth with which information is disseminated, it has also enabled many undesirable results. One of the most notable undesirable results associated with the implementation of such networks is the ease of the transmission of computer viruses, worms and other malicious applications. More specifically, before the advent of the Internet and local intranets, users rarely read or copied data onto their computers from unknown external sources. However, users today routinely receive data from unknown computers via e-mail or via download from the world-wide-web using, for example, a web browser. As such, any company or service provider providing network access is concerned with security. In particular, viruses and other malicious applications are a threat that needs to be contained. Most malicious applications exploit known security flaws in popular operating systems, in particular ones that are in widespread use, such as all versions of Microsoft Windows®. They first infect a vulnerable station, and then use this host to initiate communication with the purpose of spreading the infection and/or overloading a network.

Most currently available virus protection software packages focus on identifying and removing viruses from a system. The virus protection programs protect the computer by scanning e-mail and other files for know sections of a virus or worm. Whenever a file is identified as containing a known virus or worm, the user is alerted and the file can be removed or the virus within the file may be removed. Whenever a new virus is identified, new code is written to search for the identifiable features of the new virus. However, these software programs are ineffective against new viruses that have been created after the virus software program was created since the virus protection software will not know what the identifiable features of the new virus are and will thus not find it when it scans the files.

SUMMARY OF THE INVENTION

The present invention addresses various deficiencies in the prior art by providing a method, apparatus and network architecture for enforcing the security policies required to gain access to a network using a sub-network.

In one embodiment of the present invention a method of enforcing the security policies of a network includes determining if a client desiring a connection to the network is in conformance with a current version of the security policies, and if a client is not in conformance with a current version of the security policies, denying the client access to the network and directing the client to an isolated sub-network for accessing a current version of the security policies. In various embodiments of the present invention, in the isolated sub-network, a non-conforming client is directed by a captive portal to a local server for accessing a current version of the security policies. In alternate embodiments of the present invention, in the isolated sub-network, a non-conforming client is directed by a captive portal to a web server which directs the client to a predetermined web-site for accessing a current version of the security policies.

In an alternate embodiment of the present invention, an address for enforcing the security policies of a network upon a client requesting a connection to the network includes a memory for storing information and program instructions and a processor for executing the instructions. The address server is adapted to perform the steps of a method of the present invention and, particularly in one embodiment, to perform the steps of determining if a client desiring a connection to the network is in conformance with a current version of the security policies of the network, and if a client is not in conformance with a current version of the security policies, denying the client access to the network and directing the client to an isolated sub-network for accessing a current version of the security policies.

In an alternate embodiment of the present invention a network architecture for enforcing security policies of a network upon a client requesting a connection to the network includes at least one client, an isolated sub-network for making accessible to non-conforming clients a current version of the security policies and for isolating the non-conforming clients from network resources, where the network includes at least an address server for controlling the access of the at least one client to the network. In the network architecture, the address server is adapted to determine if a client desiring a connection to the network is in conformance with a current version of the security policies, and if a client is not in conformance with a current version of the security policies, to deny the client access to the network. The address server further directs the client to the isolated sub-network for accessing a current version of the security policies.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

Although various embodiments of the present invention are being depicted herein with respect to an IP network, the specific embodiments of the present invention should not be treated as limiting the scope of the invention. It will be appreciated by one skilled in the art and informed by the teachings of the present invention, that the concepts of the present invention may be applied in substantially any network for enforcing security policies using at least an isolated portion of a network.

Figure 1:
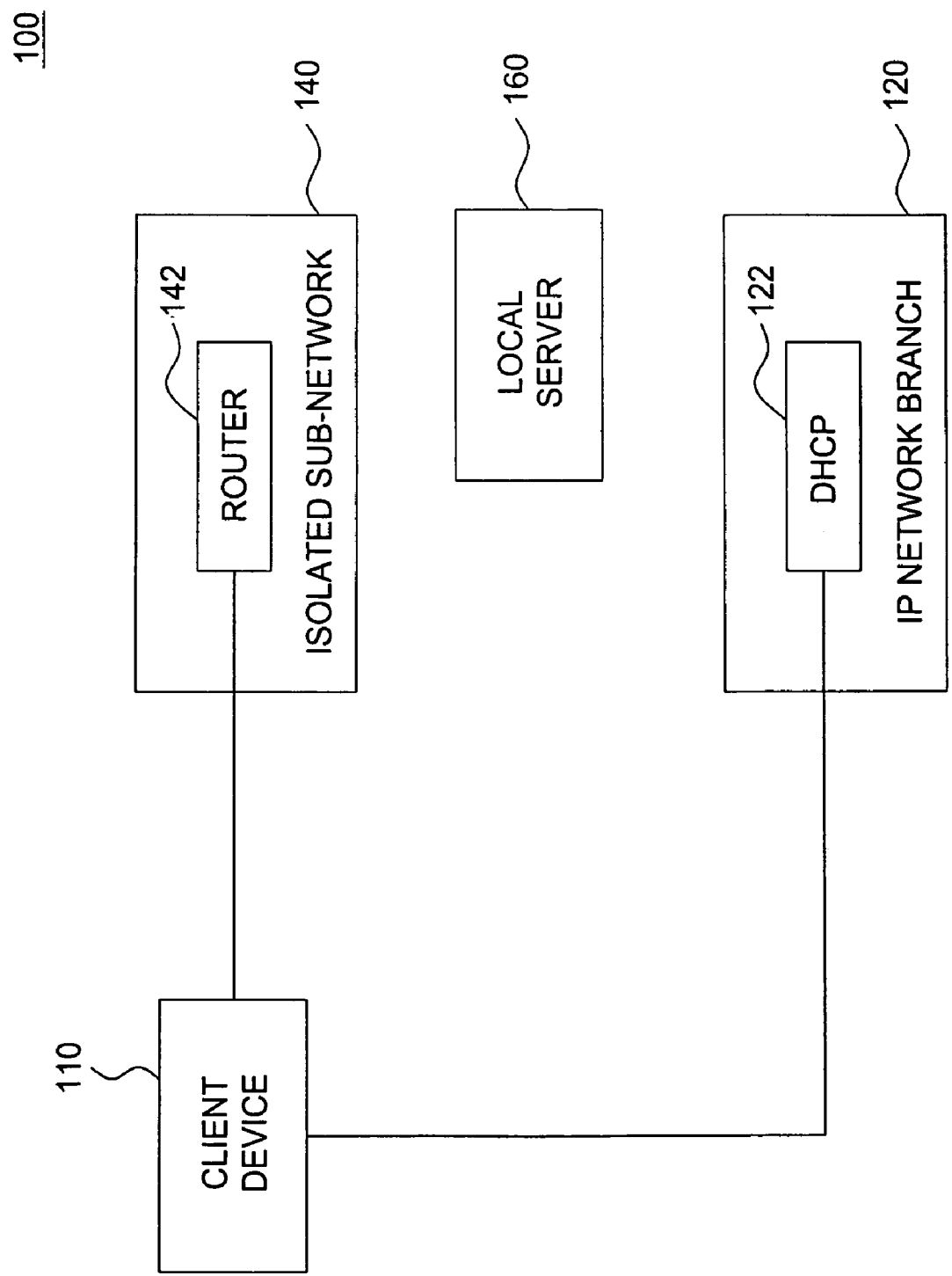
FIG. 1 depicts a high-level block diagram of a portion of an IP network having an isolated sub-network in accordance with one embodiment of the present invention.

FIG. 1 depicts a high-level block diagram of a portion of an IP network having an isolated sub-network in accordance with one embodiment of the present invention. The IP network 100 of FIG. 1 illustratively comprises a client device 110, an IP network branch 120 and an isolated sub-network 140 (referred to herein as a quarantine sub-network). The sub-network 140 of the IP network 100 of FIG. 1 illustratively comprises a captive portal (illustratively a router) 142. The IP network branch 120 of the IP network 100 comprises a typical IP network comprising typical IP network components such as an IP address server (illustratively a DHCP server) 122. The IP network branch 120 further comprises other typical network components such as file servers, other clients and web servers (not shown). The IP address server 122 of the IP network 100 of FIG. 1 maintains information regarding a latest version of client software and the latest security policies required for communication with the IP network branch 120 of the IP network 100. The latest security information may comprise information regarding security measures required for communication with the IP network branch 120 such as a latest version of a virus protection software. The client software may comprise software needed by a client for downloading the security policies or for performing other security measures as indicated by the security policies.

Although in the IP network 100 of FIG. 1, the IP address server 122 is illustratively depicted as a DHCP server, in alternate embodiments of the present invention other servers, such as a PPP dial-in server may be implemented in an IP branch of an IP network of the present invention. Similarly, although in the IP network 100 of FIG. 1, the captive portal 142 is illustratively depicted as a router, in alternate embodiments of the present invention other devices, such as domain name servers (DNS) may be implemented in a sub-network of an IP network of the present invention to redirect a client communication request. For example, a DNS server that returns the same IP address for all requests may be implemented to direct a client to a web server, which is configured to always present a predetermined start page.

Figure 2:
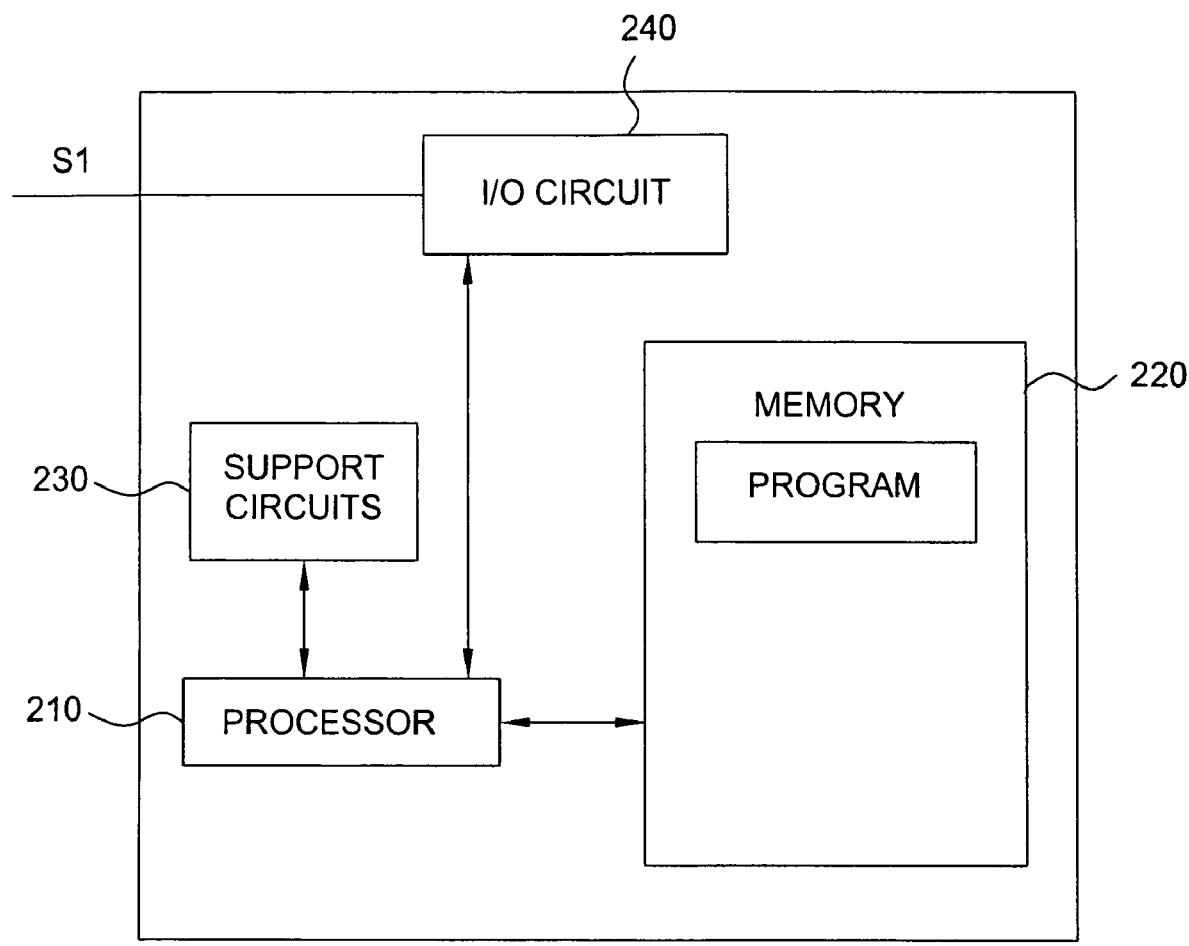
FIG. 2 depicts a high-level block diagram of an embodiment of an address server suitable for use in the IP network of FIG. 1.

FIG. 2 depicts a high level block diagram of an address server suitable for use in the IP network branch 120 of the IP network 100 of FIG. 1. The address server 122 of FIG. 2 comprises a processor 210 as well as a memory 220 for storing information and control programs. The processor 210 cooperates with conventional support circuitry 230 such as power supplies, clock circuits, cache memory and the like as well as circuits that assist in executing the software routines stored in the memory 220. The address server 122 also contains input-output circuitry 240 that forms an interface between the various functional elements communicating with the address server 122. For example, in the embodiment of FIG. 1, the address server 122 communicates with the client 110 via a signal path S1.

Although the address server 122 of FIG. 2 is depicted as a general purpose computer that is programmed to perform various control functions in accordance with the present invention, the invention can be implemented in hardware, for example, as an application specified integrated circuit (ASIC). As such, the process steps described herein are intended to be broadly interpreted as being equivalently performed by software, hardware, or a combination thereof.

In the IP network 100 of FIG. 1, when the client 110 establishes a connection with the IP branch 120 of the IP network, the IP address server 122 examines the connection from the client 110 for a special mark or token sent by the client 110. For example, in the case when a DHCP server is implemented as the IP address server 122, the DHCP server may implement a DHCP Client-Id option to examine the connection from the client 110 for a special mark or token. When this mark indicates conformance to the latest security policy (i.e., determined by, for example calculating a hash value over the security policy file, and comparing this value against the value provided in the client mark), the IP address server 122 issues an IP address to the client 110 for communication with the IP network branch 120 as in conventional IP networks.

The security policies of the present invention may be expressed in substantially any format and specifically in various known formats, such as passive formats (e.g., documents in a memory of a client) or active formats (e.g., script) such that they are capable of being examined by the IP address server 122. For example, in various embodiments of the present invention, security policies are expressed in a scripting language (e.g., JavaScript, VBScript, etc.) which is executed on the client 110. Using a scripting language, reference may be made to the state of the local machine, for example the Windows registry, a version of the operating system installed, installed patches and software, versions of applications installed, services running, network ports open for receiving packets, general configuration and settings, and users logged into the system, to determine if a client is in conformance with the latest security policies.

Referring back to FIG. 1, when it is determined by the IP address server 122 that the client 110 provides no mark or an invalid (outdated) mark (e.g., an outdated virus protection software and/or other outdated security policies), the client 110 is assigned by the IP address server 122 an IP address from a predetermined sub-network range adapted to direct the client 110 to the sub-network 140 of the IP network 100 of FIG. 1. The sub-network range may include, for example, IP address from a special range (10.9.x.x). This range is part of a free private address space and is not routable across the Internet. This means that routers to the Internet will by default not forward packets with a source address in this range. The isolation is completed by making sure that packets with a source address in this range are also not forwarded by internal routers, and are filtered out at each server that is to be protected (e.g. file servers, mail servers, etc.) using standard packet filter functionality/rules. More specifically, in the present invention, the sub-network address directs the client 110 to the sub-network 140 (the quarantine sub-network), which forms a separate logical network which is isolated from the rest of the IP network 100 and in particular from network resources of the IP network branch 120, such as file servers, other clients, web servers , etc. As described above, the isolated sub-network 140 comprises a logically separate (instead of physically separate) network. However, in alternate embodiments of the present invention, an IP network in accordance with the present invention may implement two physical sockets and interaction with a user to put a cable in a first socket A (checked) or a second socket B (quarantine). However, the second solution is not very practical.

In various embodiments of the present invention and referring to FIG. 1, in the isolated sub-network 140, a captive portal 142 redirects the client 110 to an optional local server 160. The local server 160 contains client software which contains at least the required security policies and which must be downloaded and run in order to obtain the 'approved' mark required for access to the IP network branch 120. The client software provides a policy file describing the required patches/software and security policies that must be installed on the client 110 to be given access to the IP network branch 120. The client software may also perform additional checks, such as a scanning the client 110 for viruses. A distinct advantage of the present invention is that with the configuration described above client software is able to be downloaded by the client 110 and as such does not have to be pre-installed on the client 110. As a result, security conformance may be determined and enforced by the network without the need for clients to have client software installed. Alternatively though, it is still within the concepts of the present invention for clients to have client software installed and to have the client software updated and upgraded as necessary by a local server or other source as described above.

Once the client software has confirmed conformance to the security policy, the client 110 is marked 'accepted', for instance by setting a DHCP client-ID to a predetermined value, and renewal of the previously sought IP address is requested. After the client 110 is marked 'accepted', the IP address server 122 will detect conformance in the communication from the client 110 and issues an IP address to the client 110 for communication with the IP network branch 120 as in typical IP networks.

In an alternate embodiment of the present invention and again referring to FIG. 1, the captive portal 142 in the isolated sub-network 140 comprises a web portal. The web portal intercepts all web browser requests from the client 110 and redirects the client 110 to a web page (not shown). On the web page, a link is provided to a client software and security policies which must be downloaded and run in order to obtain the 'approved' mark required for access to the IP network branch 120. As previously described, the client software provides a policy file describing the required patches/software and security policies that must be installed on the client 110 to be given access to the IP network branch 120. The client software may also perform additional checks, such as a scan for viruses. Alternatively, a list of missing patches and other (security) updates is presented to a user, with links to where the updates may be downloaded. These updates may be retrieved and installed using the quarantine sub-network 140.

As before, once the client software has confirmed conformance to the security policies, the client 110 is marked 'accepted' (i.e., by setting a DHCP client id to a predetermined value) and renewal of the previously sought IP address is requested. This time, the IP address server 122 detects conformance in the communication from the client 110 and issues an IP address to the client 110 for communication with the IP network branch 120 as in typical IP networks.

Figure 3:
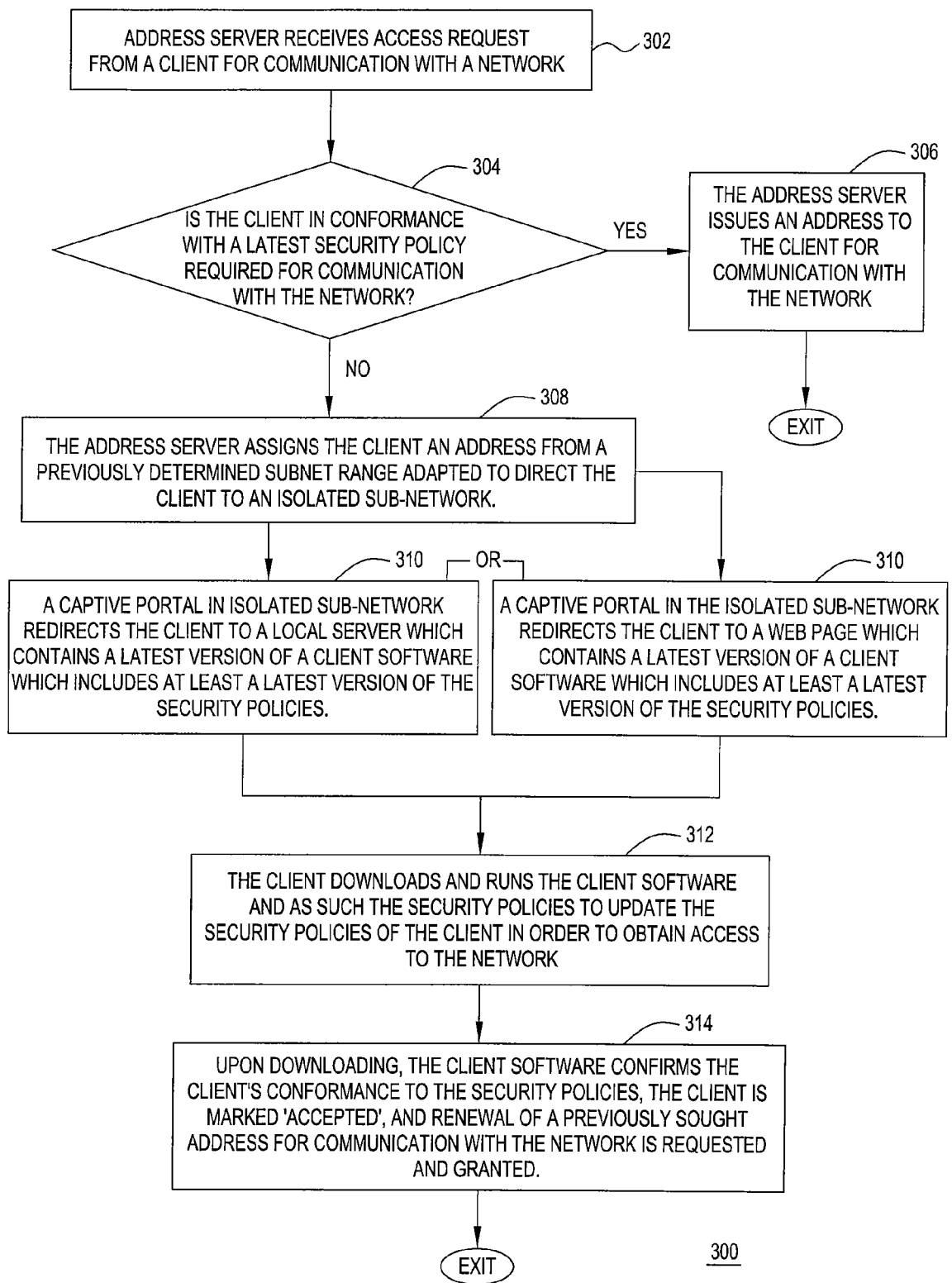
FIG. 3 depicts a method for enforcing security policies using a sub-network in accordance with one embodiment of the present invention.

FIG. 3 depicts a method for enforcing security policies using a sub-network in accordance with an embodiment of the present invention. The method 300 is entered at step 302 where an access request from a client is received by an IP address server of an IP network for access to the IP network. The method 300 then proceeds to step 304.

At step 304, the IP address server of the IP network examines the request from the client for a special mark or token communicated by the client for conformance with a latest security policy required for communication with the IP network. If the communication from the client indicates conformance with the required latest security policy, the method 300 proceeds to step 306. If the communication from the client indicates non-conformance with the required latest security policy, the method 300 proceeds to step 308.

At step 306, the IP address server of the IP network issues an IP address to the client for communication with the IP network. The method 300 is then exited.

At step 308, the IP address server of the IP network assigns the client an IP address from a previously determined sub-network range adapted to direct the client to an isolated sub-network. The method 300 then proceeds to step 310.

At step 310, a captive portal in the isolated sub-network redirects the client to a local server which contains a latest version of a client software which includes at least a latest version of the security policies. The method 300 then proceeds to step 312.

At an alternate step 310, a captive portal in the isolated sub-network is a web portal. The web portal intercepts all web browser requests from the client and redirects the client to a web page. On the web page, a link is provided to a latest version of a client software which includes at least a latest version of the security policies.

At step 312, the client downloads and runs the client software to update the security policies of the client in order to obtain access to the IP network branch. At step 312, the client software may also perform virus scans for the client. The method 300 then proceeds to step 314.

At step 314, upon being downloaded by the client, the client software confirms conformance of the client to the security policies, the client is marked 'accepted', and renewal of the previously sought IP address is requested from and granted by the IP address server. The method 300 is then exited.

Although various embodiments of the present invention were described with reference to FIG. 1 where a client was directed to an isolated sub-network via an IP address, the above embodiments are not the only conceivable implementations for providing the isolation of the present invention. For example, in a network attempting to fulfill a dial-up connection, redirection of a client to an isolated sub-network (i.e., isolation or quarantine) may be implemented by calling a specific number which directs the client onto a predetermined dial-in server (e.g. 0800-QUARANTINE) adapted to provide updates to the security policies of the client.

In an alternate embodiment of the present invention, another possibility for isolating a quarantined client is to use multiple virtual local area networks (VLANs). A VLAN is defined as a network of computers that behave as if they are connected to the same wire even though they may actually be physically located on different segments of a LAN. VLANs are configured through software rather than hardware, which makes them extremely flexible. In such an embodiment, a client is required to do authentication before being granted network access. A client is assigned different VLAN IDs in a RADIUS server reply. One such VLAN ID would be the 'quarantine VLAN' and switches are configured to forward packets on this VLAN to specific ports such that no critical machines or resources may be reached by a client through the VLAN when routing packets from a quarantined client.

In an alternate embodiment of the present invention, 802.1X authentication, and in particular an extensible authentication protocol (EAP) tunneled method, is implemented to isolate a quarantined client. In such an embodiment, an outer identity (i.e., an identity used for setting up a tunnel) is set to a predetermined string value (e.g., the hash value). With such a configuration, a RADIUS server may distinguish compliant clients from non-compliant clients and return an appropriate VLAN ID (regular or quarantined, respectively) and/or specific IP address to issue to a client.

In yet an alternate embodiment of the present invention, a virtual private network (VPN) tunnel connection is implemented to isolate a quarantined client. In such an embodiment a different VPN server address (name or IP address) is used for clients under quarantine. The VPN server may also implement quarantine by implementing a special set of IP filtering rules when routing packets from quarantined clients such that only predetermined restricted servers are able to be reached by a quarantined client. Alternatively, a separate physical Ethernet card may be added to a VPN server and only packets from quarantined clients forwarded to that Ethernet interface.

While the forgoing is directed to various embodiments of the present invention, other and further embodiments of the invention may be devised without departing from the basic scope thereof. As such, the appropriate scope of the invention is to be determined according to the claims, which follow.

What is claimed is:

1. A computer program product embodied in a non-transitory computer readable storage medium, the computer program product comprising computer instructions which, when executed by a processor, cause the processor to perform a method for enforcing security policies of a network, the method comprising:
   determining if a client desiring a connection to the network is in conformance with a current version of said security policies, wherein said security policies are expressed in an active format adapted to execute on a client and conformance is determined by examining a token sent by the client; and
   if a client is not in conformance with the current version of said security policies, restricting client access to said network of a plurality of virtual local area networks (VLANs), by using an extensible authentication protocol (EAP) to authenticate the client as a valid user of only a subset of available virtual local area networks (VLANs) within the network.

2. The computer program product of claim 1, wherein upon downloading the current version of said security policies, a client generates the token.

3. The computer program product of claim 1, wherein conforming clients are issued an address to connect to said network.

4. The computer program product of claim 1, wherein a non-conforming client is directed to said network of a plurality of virtual local area networks by being issued a predetermined address adapted to direct said client to said network of a plurality of virtual local area networks.

5. The computer program product of claim 1, wherein a non-conforming client is directed to said isolated sub-network by calling a specific number adapted to direct said client onto a predetermined isolated dial-in server.

6. The computer program product of claim 1, wherein a non-conforming client is directed to said isolated sub-network by a virtual local area network (VLAN) id adapted to direct said client onto a predetermined isolated VLAN.

7. The computer program product of claim 1, wherein a non-conforming client is directed to said isolated sub-network by a virtual private network (VPN) server address adapted to direct said client onto a predetermined isolated VPN server.

8. The computer program product of claim 7, wherein said isolated VPN server further implements a set of filtering rules such that only predetermined restricted servers are able to be reached by said non-conforming client.

9. The computer program product of claim 7, wherein said isolated VPN server comprises a separate physical Ethernet card and said non-conforming client is directed to an Ethernet interface of said Ethernet card.

10. The computer program product of claim 1, wherein said isolated sub-network isolates a non-conforming client from all network resources.

11. The computer program product of claim 1, wherein said isolated sub-network directs a non-conforming client to a local server for accessing a current version of said security policies.

12. The computer program product of claim 1, wherein said isolated sub-network directs a non-conforming client to a web server which directs said non-conforming client to a predetermined web-site for accessing a current version of said security policies.

13. An apparatus for enforcing security policies of a network upon a client requesting a connection to said network, said apparatus comprising a memory for storing information and program instructions and a processor for executing said instructions, said apparatus adapted to perform the steps of:
   determining if a client desiring a connection to the network is in conformance with a current version of said security policies, wherein said security policies are expressed in an active format adapted to execute on a client and conformance is determined by examining a token sent by the client; and
   if a client is not in conformance with the current version of said security policies, restricting client access to said network of a plurality of virtual local area networks (VLANs), by using an extensible authentication protocol (EAP) to authenticate the client as a valid user of only a subset of available virtual local area networks (VLANs) within the network.

14. The apparatus of claim 13, wherein said apparatus comprises an address server.

15. The apparatus of claim 13, wherein said apparatus directs a non-conforming client to said network of a plurality of virtual local area networks by issuing said client a predetermined address adapted to direct said client to said network of a plurality of virtual local area networks.

16. The apparatus of claim 13, wherein said isolated network makes accessible to non-conforming clients a current version of said security policies.

17. The apparatus of claim 13, wherein said apparatus issues a conforming client an address for connection with said network.

18. A network architecture for enforcing security policies of a network upon a client requesting a connection to said network, said network architecture comprising:
   at least one client adapted to execute, among other applications, security policies that are expressed in an active language;
   an isolated sub-network for making accessible to non-conforming clients a current version of said security policies and isolating said non-conforming clients for network resources; and
   said network, including;
   an address server for controlling the access of said at least one client to said network; and
   wherein said address server is adapted to perform the steps of:
   determining if a client desiring a connection to said network is in conformance with the current version of said security policies wherein conformance is determined by examining a token sent by the client; and
   if a client is not in conformance with the current version of said security policies, restricting client access to said network of a plurality of virtual local area networks (VLANs), by using an extensible authentication protocol (EAP) to authenticate the client as a valid user of only a subset of available virtual local area networks (VLANs) within the network.

* * * * *